(12) United States Patent
Toews

(10) Patent No.: US 8,033,384 B2
(45) Date of Patent: Oct. 11, 2011

(54) STEERABLE WHEEL FOR AN AGRICULTURAL CONVEYOR

(76) Inventor: Bernie John Toews, MacGregor (CA)

( * ) Notice: Subject to any disclaimer, the term of this patent is extended or adjusted under 35 U.S.C. 154(b) by 404 days.

(21) Appl. No.: 12/327,032

(22) Filed: Dec. 3, 2008

(65) Prior Publication Data

US 2009/0145721 A1 Jun. 11, 2009

(30) Foreign Application Priority Data

Dec. 10, 2007 (CA) .................................... 2614538

(51) Int. Cl.
*B65G 41/00* (2006.01)
(52) U.S. Cl. ........................................ 198/617; 198/300
(58) Field of Classification Search .................. 198/300, 198/311, 317, 617; 280/419, 426, 442, 492; 180/253, 264, 308, 411; 414/503, 526
See application file for complete search history.

(56) References Cited

U.S. PATENT DOCUMENTS

| | | | | |
|---|---|---|---|---|
| 3,297,148 A | * | 1/1967 | Andrews | 198/304 |
| 3,731,569 A | * | 5/1973 | Quanrud | 83/356.3 |
| 3,891,109 A | * | 6/1975 | Olson | 414/502 |
| 4,019,644 A | * | 4/1977 | Seymour | 414/481 |
| 4,135,614 A | * | 1/1979 | Penterman et al. | 198/306 |
| 4,142,621 A | * | 3/1979 | Oliver | 198/318 |
| 4,428,182 A | * | 1/1984 | Allen et al. | 56/14.6 |
| 4,526,265 A | * | 7/1985 | Enns | 198/318 |
| 5,165,512 A | * | 11/1992 | Driear | 198/318 |
| 5,904,365 A | * | 5/1999 | Dillon | 280/419 |
| 6,386,352 B1 | | 5/2002 | Baker et al. | |
| 6,488,140 B2 | * | 12/2002 | Eberle et al. | 198/314 |
| 6,604,620 B2 | * | 8/2003 | Dennis | 198/312 |
| 7,131,704 B2 | * | 11/2006 | Murray et al. | 299/39.2 |
| 7,488,149 B2 | * | 2/2009 | Waldner | 414/532 |

* cited by examiner

*Primary Examiner* — Douglas Hess
(74) *Attorney, Agent, or Firm* — Ryan W. Dupuis; Kyle R. Satterthwaite; Ade & Company Inc.

(57) ABSTRACT

An agricultural conveyor is supported on a pair of steerable wheels such that the steerable wheels are pivotal relative to the conveyor frame about respective upright axes. A hydraulically actuated steering mechanism is arranged to commonly pivot the steerable wheels together relative to the conveyor frame. A hydraulic connector is arranged to connect the hydraulically actuated steering mechanism to a controllable hydraulic output of the towing vehicle.

10 Claims, 2 Drawing Sheets

STEERABLE WHEEL FOR AN AGRICULTURAL CONVEYOR

This application claims foreign priority benefits from Canadian Patent Application 2,614,538, filed Dec. 10, 2007.

FIELD OF THE INVENTION

The present invention relates to a kit of parts and method of use of the parts for steering an agricultural conveyor of the type which is towed by a towing vehicle, so that the conveyor can be steered relative to the towing vehicle during towing.

BACKGROUND

Conveyors, and more particularly auger type screw conveyors, are available in relatively large sizes for agricultural applications. Conveyors of this type typically include a tubular housing supported on wheels which are parallel and spaced apart from one another on opposing sides of the housing and fixed in orientation for rolling movement in the longitudinal direction of the housing so as to be suitable for towing by a tractor and the like. Because of the large sizes of some conveyors, these conveyors can be very difficult and awkward to navigate during transport.

Auger moving kits are known, for example a self propelled auger transport kit available by Wheatheart, but such known systems are typically very limited in size and involve the costly addition of an auxiliary set of wheels supported on an auxiliary frame along with an additional motor suitable only for transport of smaller agricultural augers. Steering is typically accomplished in a skid steer configuration. No means are provided for steering the conveyor relative to a vehicle during transport.

SUMMARY OF THE INVENTION

According to one aspect of the invention there is provided a steering kit for steering a conveyor comprising a conveyor housing for conveying material therein from an inlet end to an outlet end, a conveyor frame supporting the conveyor housing for rolling movement on conveyor wheels, and a hitch connector for hitching the conveyor to a towing vehicle, the kit comprising:

a pair of steerable wheels arranged to replace the conveyor wheels to support the conveyor frame thereon such that the pair of steerable wheels are pivotal relative to the conveyor frame about respective upright axes;

a hydraulically actuated steering mechanism arranged to commonly pivot the steerable wheels together relative to the conveyor frame; and a hydraulic connector arranged to connect the hydraulically actuated steering mechanism to a controllable hydraulic output of the towing vehicle.

By providing steerable wheels which are controllable relative to the housing of the auger and accordingly relative to the towing vehicle, the direction of the auger can be readily controlled for steering positioning of the auger conveyor during transport. By further connecting the steerable wheels through a hydraulically actuated steering mechanism to a hydraulic output of the towing vehicle by a hydraulic connector, steering of the conveyor is readily controlled by the operator of the towing vehicle. The components of the kit for attachment to a conveyor are relatively simple and result in a simple and easy to assemble structure on the conveyor so as to be readily adaptable to various types of conveyors both at the time of manufacture and for retrofitting existing conveyors either of belt or auger type.

According to a second aspect of the present invention there is provided a steerable conveyor for towable connection to a towing vehicle, the conveyor comprising:

a conveyor housing for conveying material therein from an inlet end to an outlet end;

a conveyor frame supporting the conveyor housing for rolling movement on a pair of steerable wheels;

a hitch connector arranged for hitching the conveyor housing to the towing vehicle;

the pair of steerable wheels being pivotal relative to the conveyor frame about respective upright axes;

a hydraulically actuated steering mechanism arranged to commonly pivot the steerable wheels together relative to the conveyor frame;

a hydraulic connector arranged to connect the hydraulically actuated steering mechanism to a controllable hydraulic output of the towing vehicle.

The hydraulically actuated steering mechanism may comprise a connecting member connected between the pair of steerable wheels and a single hydraulic actuator for steering both steerable wheels together.

The connecting member is preferably adjustable in length.

The hydraulic actuator may be arranged to directly pivot one of the steerable wheels relative to the conveyor frame.

The steerable wheels are preferably supported for pivotal movement relative to the frame by a suitable mounting bracket secured to the conveyor frame by threaded fasteners.

The steerable wheels may be pivotally supported relative to the conveyor frame by respective mounting brackets which support the steerable wheels on the conveyor frame independently of one another.

The steerable wheels may be arranged to be supported on the conveyor frame at a wider spacing than the conveyor wheels.

When used in combination with a towing vehicle having an operator controllable hydraulic output, the hydraulically actuated steering mechanism is preferably coupled to said output.

The device may be provided in combination with a conveyor comprising an auger conveyor having a screw supported in the housing for rotation about a longitudinal axis of the housing to convey material from the inlet end to the outlet end of the conveyor housing.

According to a further aspect of the present invention there is provided a method of steering a conveyor comprising a conveyor housing for conveying material therein from an inlet end to an outlet end, the method comprising:

supporting the conveyor housing for rolling movement across the ground on a pair of steerable wheels which are pivotal relative to the conveyor frame about respective upright axes;

providing a hydraulically actuated steering mechanism arranged to commonly pivot the steerable wheels together relative to the conveyor frame;

hitching the conveyor housing to a towing vehicle; and connecting the hydraulically actuated steering mechanism to a controllable hydraulic output of the towing vehicle.

The method may include independently supporting the steerable wheels for pivotal movement relative to the conveyor frame by respective mounting brackets.

Preferably the two steerable wheels are the only wheels supporting the conveyor frame thereon.

For a conveyor supported on conventional conveyor wheels, the method preferably includes replacing the conventional conveyor wheels with the steerable wheels and supporting the steerable wheels on the conveyor frame at a wider spacing than the conventional conveyor wheels.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
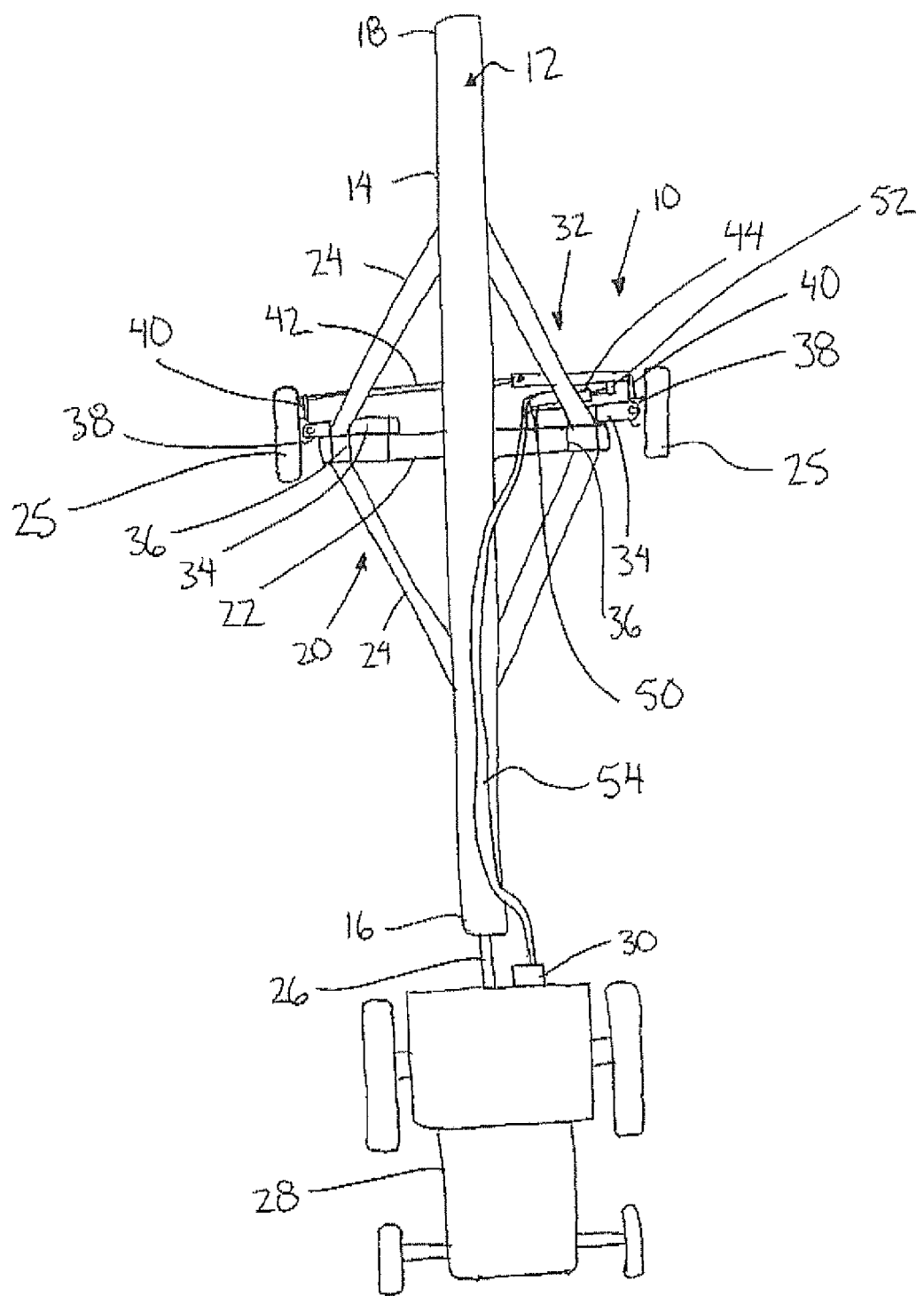
FIG. 1 is a schematic plan view of a conveyor connected to a towing vehicle upon which steerable wheels are provided.
Figure 2:
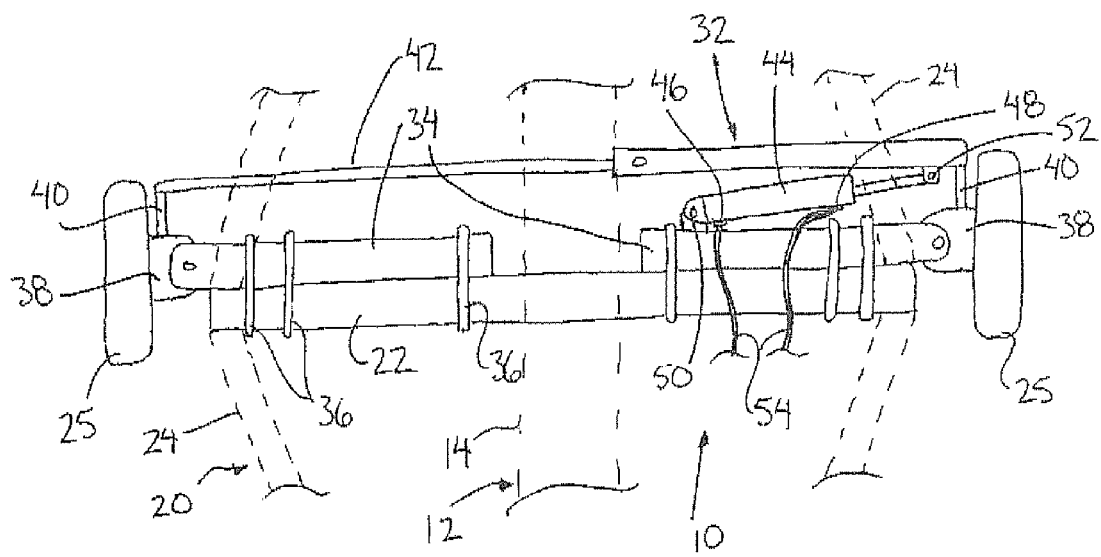
FIG. 2 is an enlarged plan view of the steerable wheels of the conveyor according to FIG. 1.
Figure 3:
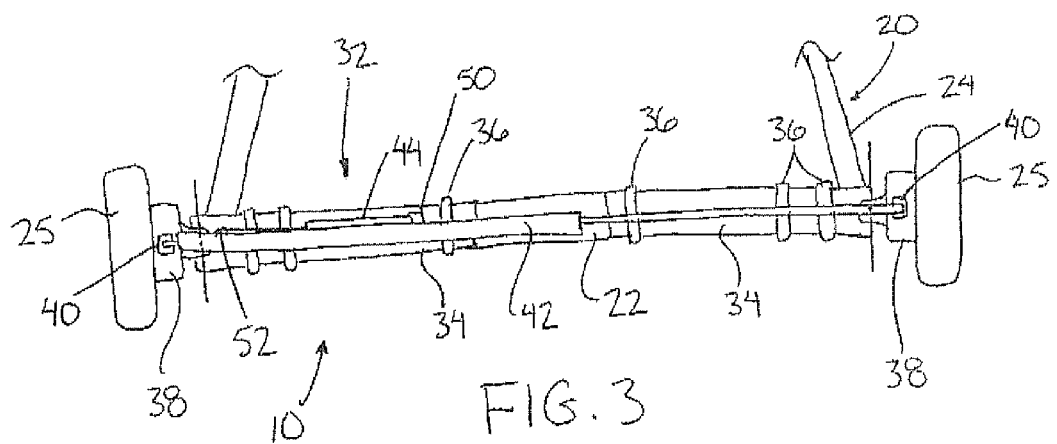
FIG. 3 is a rear elevational view of the steerable wheels according to FIG. 2.

Referring to the accompanying figures there is illustrated a conveyor steerable wheel system generally indicated by reference numeral 10. The system 10 is particularly suited for use with an agricultural conveyor 12, and more particularly for large screw type auger conveyors.

The conveyor 12 of the illustrated embodiment comprises an elongate tubular housing 14 supporting a screw auger therein which is arranged to convey material from an inlet end 16 to an outlet end 18 of the housing when rotated about a longitudinal axis thereof.

A frame 20 supports the housing 14 at an upward angle or inclination from the inlet end 16 to the outlet end 18 thereof. In a conventional auger, the frame 20 supports the housing 14 for rolling movement on a pair of wheels of fixed orientation rotating about a common axis for rolling movement in a general longitudinal direction of the tubular housing 14.

The frame 20 of the conveyor of the illustrated embodiment includes a crossbar 22 extending laterally across the bottom of the frame generally perpendicularly to the longitudinal direction of the housing 14 to support a steerable wheel 25 of the system 10 at each end of the crossbar 22. The crossbar 22 thus positions the pair of steerable wheels 25 at laterally spaced positions on opposing sides of the elongate tubular housing 14.

The frame 20 further comprises a pair of frame members 24 extending from each end of the crossbar 22 in opposing longitudinal directions to extend upwardly towards the respective inlet or outlet end of the housing. Each of the four frame members 24 thus spans from the crossbar 22 at one end thereof, to the tubular housing at a location spaced in the longitudinal direction from the wheels.

A hitch connector 26 is supported adjacent the inlet end 16 on the housing 14 for connection to a towing vehicle, for example a tractor 28 for towing the conveyor 12 similar to a conventional trailer relative to the tractor 28. The tractor 28 of the illustrated embodiment includes a hydraulic power take-off or output 30 comprising hydraulic supply and return lines which are controllable by an operator of the tractor to control steering of the steerable wheels 25 of the system 10.

The system 10 generally comprises a kit of parts including the steerable wheels 25 and a hydraulically actuated steering mechanism 32 arranged to controllably steer the steerable wheels 25 relative to the frame 20 of the conveyor as controlled by the operator of the towing vehicle.

Each wheel 25 is independently mounted onto the crossbar 22 by a respective mounting bracket 34. In a retro fit of an existing conveyor, the mounting brackets 34 are arranged to support the steerable wheels 25 at a wider spacing than fixed wheels previously supporting the conveyor thereon.

In the illustrated embodiment, each mounting bracket 34 generally comprises a beam element, for example comprising a tubular member of rectangular cross section in the order of four inches by six inches. Each beam element extends less than half of the length of the cross bar 22 so that the beam elements of the two mounting brackets can each be mounted alongside the crossbar 22 at opposing ends thereof. A plurality of clamping members 36 serve to mount each beam element to the crossbar. Each beam element is supported by a pair of the clamping members 36 adjacent one another at an outer end of the element and an additional clamping member 36 adjacent an inner end thereof. In the illustrated embodiment the clamping members comprise U-shaped bolts arranged to extend about the crossbar 22 to clamp the beam element onto the rear side of the crossbar.

The beam elements of the two mounting brackets 34 are supported on the crossbar to extend laterally outwardly beyond the end of the crossbar in each instance. The outer ends of the beam elements are each configured for pivotally supporting a respective spindle 38 thereon which is pivotal relative to the beam element and the frame of the conveyor about a respective vertical axis. Each spindle 38 mounts a respective one of the steerable wheels 25 rotatably thereon about a horizontal rotation axis of the wheels.

Each spindle includes a steering arm 40 fixed thereon which projects generally radially outward in a substantially horizontal direction from the respective wheel axis. A suitable tie rod connecting member 42 is coupled between the outer ends of the two steering arms 40 associated with the pair of steerable wheels 25 respectively. The connecting member 42 comprises a telescoping member including a first portion slidably receivable within a second portion to be extendable in a respective longitudinal direction of the member so that the length of the member can be adjusted to the distance between the steering arms of the spindles depending upon the type of conveyor upon which the system 10 is mounted. The length of the connecting member 42 is adjusted to correspond to the distance between the free ends of the steering arms 40 when the two steerable wheels are oriented parallel to one another for rolling movement in the longitudinal direction of the conveyor housing. In this manner the connecting member 42 ensures that the two steerable wheels 25 remain oriented for rolling movement in respective rolling directions which are parallel to one another as the steerable wheels 25 are pivoted relative to the frame of the conveyor housing about their respective vertical axes.

In addition to the steering arms and connecting member 42, the hydraulically actuated steering mechanism 32 further comprises a hydraulic actuator 44 in the form of a conventional hydraulic piston cylinder configuration. The actuator 44 has an extension port 46 arranged to extend the actuator when receiving hydraulic fluid under pressure and a retraction port 48 arranged to retract the actuator 44 when receiving hydraulic fluid therein under pressure. A suitable bracket 50 serves to mount the hydraulic actuator at one end on the crossbar 22 of the frame and on a control arm 52 at the other end of the actuator.

The control arm 52 in the illustrated embodiment is mounted on the connecting member 42 adjacent connection to one of the steering arms to steer both wheels by controlling movement of the connecting member connected therebetween. Alternatively, the control arm 52 may be configured similarly to one of the steering arms to extend generally radially outward in a substantially horizontal orientation from the wheel axis of one of the spindles such that the actuator steers one wheel directly and the other through the connecting member 42.

A hydraulic connector 54 is provided for connection between the extension and retraction ports 46 and 48 of the actuator 44 and the supply and return lines of the hydraulic output 30 of the towing vehicle so that extension and contraction of the actuator can be readily controlled using controls on the towing vehicle by an operator of the vehicle.

When towing a large agricultural conveyor with a tractor, if it is desirable to alter the usual path of the conveyor following the tractor, the steerable wheels 25 of the system 10 can be steered relative to the frame of the conveyor to steer the conveyor relative to the towing vehicle. In prior art configurations with wheels of fixed orientation on a conveyor, when the towing vehicle follows a curved path, the towed conveyor will tend to cut across the curve rather than following the tractor along the curved path. According to the present invention however when the tractor steers to follow a sharp curve in a first lateral direction relative to the longitudinal directions of the tractor and conveyor, the operator can use the controls of the vehicle to control the hydraulic output 30 thereof to effectively steer the wheels 25 of the conveyor in the opposing lateral direction relative to the longitudinal direction of the conveyor and towing vehicle so that the conveyor will follow a wider path and follow the tracks of the tractor about the curved path rather than cutting across the curved path as in prior art configurations. This is particularly advantageous when navigating through narrow spaces and between building and the like for example.

The steerable wheel system 10 can be available as a retrofit kit of parts including the steerable wheels 25, the mounting brackets 34 for supporting the wheels on a conveyor frame, the components of the hydraulically actuated steering mechanism including the steering arms, connecting members, and hydraulic actuator, as well as the hydraulic connector for connecting to the hydraulic output of a towing vehicle. Alternatively the system 10 maybe available as parts which are installed onto a conveyor 12 at the time of new manufacture thereof.

In further embodiments, when mounting the spindles on a conveyor frame having bolt flanges at opposing ends of the crossbar 22, the mounting brackets 34 comprise mating bolt flanges which mate with the bolt flanges on the crossbar 22 to be mounted in place of wheel mounts previously mounting conventional wheels of fixed orientation thereon. When the mounting brackets 34 comprise mating bolt flanges, the mounting brackets pivotally support respective ones of the spindles of the steerable wheels thereon for pivotal movement about respective vertical axes similarly to the previous embodiment.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of steering a conveyor comprising a conveyor housing for conveying material therein from an inlet end to an outlet end, a conveyor frame arranged to support the conveyor housing for rolling movement on conveyor wheels of fixed orientation, and a hitch connector for hitching the conveyor to a towing vehicle, the method comprising:
    connecting a pair of steerable wheels to the conveyor frame in place of the conveyor wheels of fixed orientation such that the conveyor frame is supported for rolling movement on the steerable wheels and such that the pair of steerable wheels are pivotal relative to the conveyor frame about respective upright axes;
    connecting a steering mechanism to the steerable wheels which is arranged to commonly pivot the steerable wheels together relative to the conveyor frame about their respective upright axes; and
    arranging the steering mechanism to be connectable to a controllable output of the towing vehicle.

2. The method according to claim 1 wherein the steering mechanism comprises a hydraulically actuated steering mechanism and the method includes connecting the hydraulically actuated steering mechanism to a controllable hydraulic output of the towing vehicle using a hydraulic connector.

3. The method according to claim 2 wherein the hydraulically actuated steering mechanism comprises a connecting member connected between the pair of steerable wheels and a single hydraulic actuator for steering both steerable wheels together.

4. The method according to claim 3 wherein the connecting member is adjustable in length.

5. The method according to claim 3 wherein the hydraulic actuator is arranged to directly pivot one of the steerable wheels relative to the conveyor frame.

6. The method according to claim 1 including supporting the steerable wheels for pivotal movement relative to the frame by a suitable mounting bracket secured to the conveyor frame by threaded fasteners.

7. The method according to claim 1 including pivotally supporting the steerable wheels relative to the conveyor frame by respective mounting brackets which support the steerable wheels on the conveyor frame independently of one another.

8. The method according to claim 1 including supporting the steerable wheels on the conveyor frame at a wider spacing than the conveyor wheels of fixed orientation.

9. The method according to claim 1 wherein the conveyor comprises an auger conveyor having a screw supported in the housing for rotation about a longitudinal axis of the housing to convey material from the inlet end to the outlet end of the conveyor housing.

10. The method according to claim 1 including supporting the conveyor frame on the pair of steerable wheels such that the pair of steerable wheels are the only wheels supporting the conveyor frame for rolling movement thereon.

* * * * *